United States Patent
Tokinoya (10) Patent No.: US 10,967,617 B2
(45) Date of Patent: Apr. 6, 2021

(54) GAS BARRIER FILM AND COLOR CONVERSION MEMBER

(71) Applicant: TOPPAN PRINTING CO., LTD., Tokyo (JP)

(72) Inventor: Osamu Tokinoya, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/297,684

(22) Filed: Mar. 10, 2019

(65) Prior Publication Data

US 2019/0202180 A1 Jul. 4, 2019

Related U.S. Application Data

(63) Continuation of application No. PCT/JP2017/038210, filed on Oct. 23, 2017.

(30) Foreign Application Priority Data

Oct. 24, 2016 (JP) .............................. JP2016-208040

(51) Int. Cl.
B32B 27/20 (2006.01)
B32B 9/04 (2006.01)
(Continued)

(52) U.S. Cl.
CPC ................ B32B 27/20 (2013.01); B32B 7/02 (2013.01); B32B 7/12 (2013.01); B32B 9/00 (2013.01); B32B 9/045 (2013.01); B32B 27/36 (2013.01); B32B 27/40 (2013.01); G02B 5/20 (2013.01); B32B 37/12 (2013.01); (Continued)

(58) Field of Classification Search
CPC ......... B32B 27/20; B32B 27/40; B32B 27/36; B32B 9/00; B32B 7/12; B32B 7/02; B32B 9/045; B32B 2457/202; B32B 2315/00; B32B 2307/7246; B32B 2307/7244; B32B 2307/408; B32B 2305/72; B32B 2305/30;
(Continued)

(56) References Cited

U.S. PATENT DOCUMENTS

| | | | |
|---|---|---|---|
| 2009/0095345 A1* | 4/2009 | Murakami | H01L 31/0481 136/252 |
| 2014/0017419 A1* | 1/2014 | Amanai | C23C 14/0652 428/1.32 |
| 2018/0179643 A1* | 6/2018 | Kusumoto | C23C 14/3464 |

FOREIGN PATENT DOCUMENTS

JP 2001010003 A * 1/2001
JP 2010-229291 A 10/2010
(Continued)

OTHER PUBLICATIONS

Espacenet Translation of JP-2010229291-A (Year: 2019).*
(Continued)

Primary Examiner — Michael Zhang
(74) Attorney, Agent, or Firm — Foley & Lardner LLP (57) ABSTRACT

A gas barrier film comprising a substrate layer containing a filler, an anchor coat layer provided on the substrate layer, and a gas barrier layer provided on the anchor coat layer. In the gas barrier film, an average particle diameter D of the filler is 0.02 to 3.00 μm, a thickness of the substrate layer is equal to or larger than the average particle diameter of the filler, and a total thickness T of one or more layers disposed between the substrate layer and the gas barrier layer is 0.02 to 0.40 μm.

14 Claims, 5 Drawing Sheets

(51) Int. Cl.
    *B32B 7/02*     (2019.01)
    *B32B 7/12*     (2006.01)
    *B32B 27/36*     (2006.01)
    *B32B 9/00*     (2006.01)
    *B32B 27/40*     (2006.01)
    *G02B 5/20*     (2006.01)
    *B32B 37/12*     (2006.01)

(52) U.S. Cl.
    CPC ....... *B32B 2255/10* (2013.01); *B32B 2255/26* (2013.01); *B32B 2305/30* (2013.01); *B32B 2305/72* (2013.01); *B32B 2307/408* (2013.01); *B32B 2307/7244* (2013.01); *B32B 2307/7246* (2013.01); *B32B 2315/00* (2013.01); *B32B 2457/202* (2013.01); *B32B 2457/206* (2013.01)

(58) Field of Classification Search
    CPC . B32B 2255/26; B32B 2255/10; B32B 37/12; B32B 2457/206; G02B 5/20
    See application file for complete search history.

(56) References Cited

FOREIGN PATENT DOCUMENTS

| | | | |
|---|---|---|---|
| JP | 2010229291 A | * | 10/2010 |
| JP | 2011173261 A | * | 9/2011 |
| JP | 2011-218805 A | | 11/2011 |
| JP | 2013-512257 A | | 4/2013 |
| JP | 5239230 B2 | | 7/2013 |
| JP | 2013-203414 A | | 10/2013 |
| JP | 2016-144873 A | | 8/2016 |
| JP | 2016-155262 A | | 9/2016 |

OTHER PUBLICATIONS

Espacenet Translation of JP-2011173261-A (Year: 2019).*
Espacenet Translation of JP-2001010003-A (Year: 2019).*
International Searching Authority, "International Search Report," issued in connection with International Patent Application No. PCT/JP2017/038210, dated Jan. 16, 2018.
International Searching Authority, "Written Opinion," issued in connection with International Patent Application No. PCT/JP2017/038210, dated Jan. 16, 2018.

* cited by examiner

GAS BARRIER FILM AND COLOR CONVERSION MEMBER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/038210, filed on Oct. 23, 2017, which is based upon and claims the benefit of priority to Japanese Patent Application No. 2016-208040, filed on Oct. 24, 2016; the disclosures of which are all incorporated herein by reference in their entireties.

TECHNICAL FIELD

The present invention relates to a gas barrier film and a color conversion member.

BACKGROUND ART

In light-emitting units such as backlight units of liquid crystal displays and electroluminescent light-emitting units, a light emitter may come into contact with oxygen or water vapor for a long period of time and performance as a light emitter may thereby decrease. For this reason, these light emitting units often have a structure in which a gas barrier film having a substrate and a gas barrier layer formed thereon sandwiches a light emitting layer including a light emitting body as a protective material for the light emitting body.

In particular, since a backlight unit including a blue light emitting diode (blue LED) and a color conversion member (quantum dot film) including a quantum dot light emitter for converting blue light into green or red light provides a sharp RGB spectrum, improvement in the color reproducibility and reduction in the power consumption are expected and drawing attention. However, when the quantum dots are in contact with oxygen or water vapor for a long period of time, dark spots occur in the light obtained from the backlight unit, and therefore, again, protection with a barrier film is required.

It is believed that the dark spots are due to local luminous efficiency reduction in the quantum dot film and caused by oxygen or water vapor passing through local holes in the barrier film.

It can be considered that the local holes of the gas barrier film are formed due to the following reasons: (1) protrusions on the substrate still remain after formation of the gas barrier layer, and when winding up the gas barrier film or tightening it after winding, the protrusions are pressed against the opposing gas barrier layer and this causes the gas barrier layer to crack; (2) the gas barrier layer cracks due to pressure applied during lamination of the gas barrier film; and, (3) the gas barrier layer cracks when thermal stress is applied to the gas barrier film.

PTL 1 describes that high barrier properties can be obtained by providing an organic compound layer formed of a fluororesin or the like over a substrate of the gas barrier film to secure its flatness by controlling its surface roughness to be in the range of 0.005 µm or more and 0.015 µm or less.

In PTL 2, it is described that a planarization layer is provided on the substrate of the barrier sheet to obtain effective barrier properties.

CITATION LIST

Patent Literature

[PTL 1] JP 5239230 B2; [PTL 2] JP 2013-512257 A

SUMMARY OF THE INVENTION

Technical Problem

However, regarding the gas barrier film described in PTL 1, since the coefficient of dynamic friction of the substrate is high, when a roll of the substrate is unwound and transported during production of the gas barrier film, problems such as meandering or distortion of the substrate may occur. Further, as for the barrier sheet described in PTL 2, since the planarization layer is thick, it may crack or suffer other failure due to insufficient drying or curing, and thus the appearance and the water vapor barrier properties may be impaired.

The present invention has been made in view of the above circumstances, and an object of the present invention is to provide a gas barrier film that does not have transport problems during manufacturing and has good appearance and water vapor barrier properties, and also a color conversion member obtained by using the gas barrier film.

Means for Improving or Solving the Problem

The present invention provides a gas barrier film including a substrate layer containing a filler, an anchor coat layer provided on the substrate layer, and a gas barrier layer provided on the anchor coat layer. In the gas barrier film, the filler has an average particle diameter D of 0.02 to 3.00 µm, the substrate layer has a thickness equal to or larger than the average particle diameter of the filler, and the total thickness T of one or more layers disposed between the substrate layer and the gas barrier layer is 0.02 to 0.40 µm. According to the present invention, it is possible to obtain a gas barrier film having good appearance and water vapor barrier properties without having transport problems during the production of the gas barrier film.

In the gas barrier film, the total thickness T of the one or more layers disposed between the substrate layer and the gas barrier layer is preferably 0.02 to 0.30 µm, and more preferably 0.04 to 0.25 µm. When the total thickness T is within the above ranges, generation of cracks in the layer between the substrate layer and the gas barrier layer tends to be suppressed, and better appearance and water vapor barrier properties tend to be obtained.

The gas barrier film may further include an easily-adhesive layer provided on the substrate layer, and the anchor coat layer may be provided on the easily-adhesive layer. In this case, the easily-adhesive layer preferably has a thickness of 0.01 to 0.20 µm.

In the gas barrier film, the ratio (D/T) of the average particle diameter D of the filler to the total thickness T of the one or more layers disposed between the substrate layer and the gas barrier layer is preferably larger than 5.0 and equal to or smaller than 30.0.

In the gas barrier film, preferably the anchor coat layer is formed of a composition containing acrylic polyol and an isocyanate compound.

In the gas barrier film, the gas barrier layer is composed of an inorganic compound layer provided on the anchor coat layer and an overcoat layer provided on the inorganic compound layer, and the overcoat layer is formed of a composition containing at least one selected from the group consisting of metal alkoxides represented by the following formula (1) and a hydrolyzate thereof.

$$M(OR^1)_m(R^2)_{n-m} \quad (1)$$

In the formula (1), each of $R^1$ and $R^2$ independently represents a monovalent organic group having 1 to 8 carbon atoms, M represents an n-valent metal atom, and m represents an integer from 1 to n.

The present invention also provides a color conversion member including a color conversion layer and a pair of gas barrier films formed on the two faces of the color conversion layer. In the color conversion member at least one of the gas barrier films is the above-described gas barrier film. Preferably the color conversion layer includes a phosphor composed of quantum dots. According to the color conversion member, since the gas barrier film has good water vapor barrier properties, generation of dark spots can be reduced.

Desired Effect of the Invention

The present invention provides a gas barrier film that has decreased transport problems during manufacturing and has good appearance and water vapor barrier properties, and also a color conversion member obtained by using the gas barrier film.

DESCRIPTION OF REPRESENTATIVE EMBODIMENTS

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Gas Barrier Film

Figure 1:
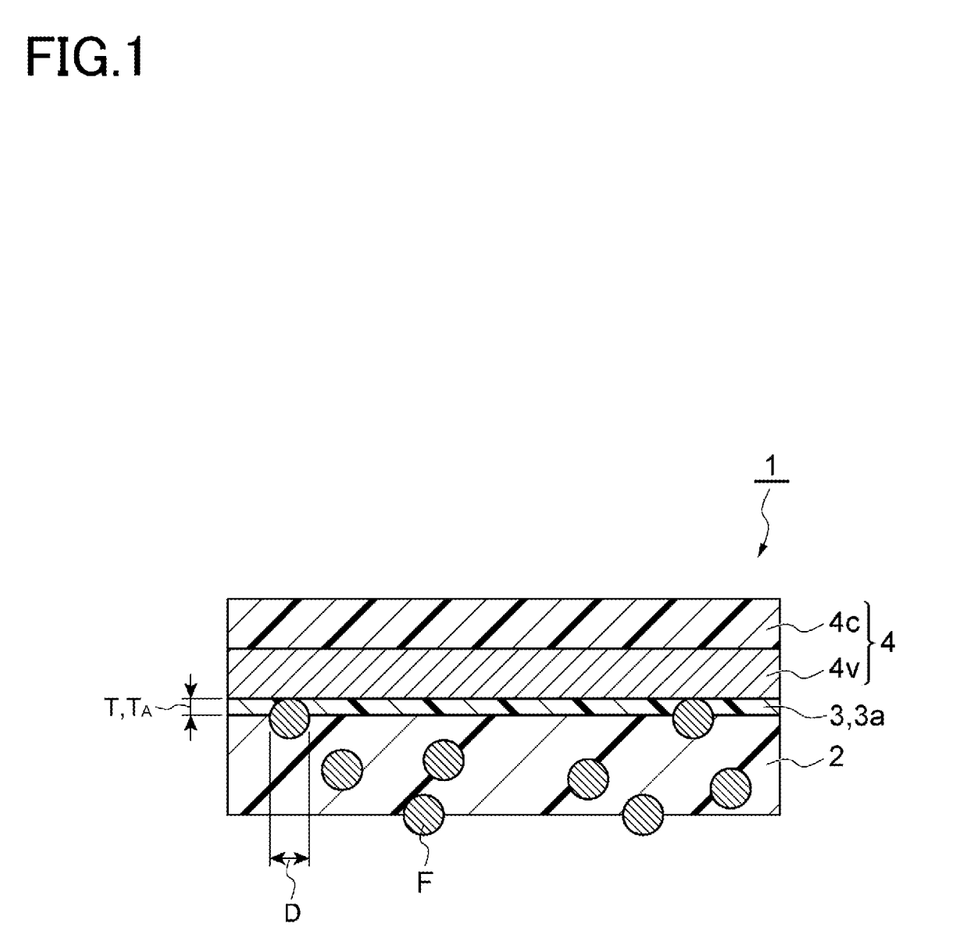
FIG. 1 is a schematic cross-sectional view showing a gas barrier film according to the first embodiment of the present invention.

FIG. 1 is a schematic cross-sectional view showing a gas barrier film according to the first embodiment of the present invention. The gas barrier film 1 according to this embodiment includes a substrate layer 2, an anchor coat layer 3a provided on the substrate layer 2, and a gas barrier layer 4 provided on the anchor coat layer 3a. In the present embodiment, the anchor coat layer 3a constitutes an organic compound layer 3, and only the anchor coat layer 3a is disposed between the substrate layer 2 and the gas barrier layer 4. The gas barrier layer 4 may be composed of, for example, an inorganic compound layer 4v provided on the anchor coat layer 3a and an overcoat layer 4c provided on the inorganic compound layer 4v.

Substrate Layer

In the present embodiment, the substrate layer 2 includes a filler F, and the average particle diameter D of the filler F is 0.02 to 3.00 μm. Further, the substrate layer 2 has a thickness equal to or larger than the average particle diameter of the filler F. Since the substrate layer 2 includes the filler F having an average particle diameter D of 0.02 μm or greater, it is possible to provide roughness on the surface of the substrate so that the coefficient of dynamic friction is fairly small, and thus the transportability of the substrate during production of the gas barrier film 1 can be improved. By improving the transportability, occurrence of meandering or distortion of the substrate during transportation is suppressed. Also, by suppressing meandering or distortion of the substrate during conveyance, it is possible to form a more uniform layer on the substrate, and deterioration of the water vapor barrier properties can be suppressed. From the same viewpoint, the average particle diameter D of the filler F may be 0.10 μm or greater, or 0.20 μm or greater. Further, when the average particle diameter of the filler F is no greater than 3.00 μm and the thickness of the substrate layer 2 is equal to or larger than the average particle diameter of the filler F, it is possible to suppress detachment of the filler F and cracking of the gas barrier layer due to the filler, and thus good water vapor barrier properties can be maintained. From the same viewpoint, the average particle diameter D of the filler F may be 2.00 μm or smaller, or smaller than 1.00 μm. Further, the thickness of the substrate layer 2 may be 2.0 to 50.0 times, or 5.0 to 20.0 times larger than the average particle diameter D of the filler F. The average particle diameter D of the filler F in the substrate layer 2 can be measured, for example, by observing the surface of the substrate layer 2 with a scanning electron microscope (SEM) and measuring the diameter of the circumscribed circle of ten fillers F, and then averaging the measurements.

Specifically, the thickness of the substrate layer 2 may be 5.0 to 100 μm, 10 to 50 μm, or 15 to 30 μm.

The surface roughness of the substrate layer 2 can be suitably expressed by the arithmetic average roughness Ra and the maximum height Ry as described below. For example, the surface roughness of the substrate layer 2 is measured for a surface of the substrate layer 2 or the substrate material forming the substrate layer 2 having a size of 1.0 mm×0.5 mm in accordance with JIS-B 0601 (1994). The arithmetic mean roughness Ra of the two main faces of the substrate layer 2 is preferably 0.10 to 3.00 μm, more preferably 0.30 to 1.00 μm, and even more preferably 0.50 to 0.80 μm. In addition, the maximum roughness Ra of the two main faces of the substrate layer 2 is preferably 0.20 to 3.00 μm, more preferably 0.50 to 2.00 μm, and even more preferably 1.00 to 1.50 μm. When the surface roughness of the substrate layer 2 is within the above ranges, it becomes easier to control the dynamic friction coefficient of the surface of the substrate layer 2.

The surface of the substrate layer 2 having the above-described surface roughness tends to have, for example, a dynamic friction coefficient of no greater than 0.40 and preferably no greater than 0.35. The dynamic friction coefficient of the substrate layer 2 is measured for a surface of the substrate layer 2 or the substrate material forming the substrate layer 2 in accordance with, for example, JIS-K7125. When the dynamic friction coefficient of the surface of the substrate layer 2 is 0.40 or smaller, the transportability of the substrate during production of the gas barrier film tends to improve. The dynamic friction coefficient of the surface of the substrate layer 2 may be no smaller than 0.01.

Examples of the filler F contained in the substrate layer 2 include inorganic fine particles of materials such as silica, aluminum silicate, titanium oxide, calcium carbonate, calcium phosphate, barium sulfate, alumina, mica, kaolin, and clay, and organic fine particles of materials such as acrylic crosslinked polymer, styrene-type crosslinked polymer, silicone resin, fluororesin, phenol resin, and nylon resin. One or more of these materials may be used.

The substrate material forming the substrate layer 2 is formed of a film made of various organic polymer compounds. Examples of the materials of the substrate material include polyolefin polymer compounds such as polyethylene and polypropylene; polyester polymer compounds such as polyethylene terephthalate and polyethylene naphthalate; cellulose polymer compounds such as triacetyl cellulose, diacetyl cellulose, and cellophane; polyamide polymer compounds such as 6-nylon and 6,6-nylon; acrylic polymer compounds such as polymethyl methacrylate; polystyrene, polyvinyl chloride, polyimide, polyvinyl alcohol, polycarbonate, and ethylene vinyl alcohol. The filler may be contained in the substrate material.

The substrate layer 2 is formed on the two main faces of a support layer to form a multilayer substrate layer having a structure of three or more layers. Since the substrate layer 2 is formed on the two main faces of the multilayer substrate layer, the two main faces of the multilayer substrate layer have the specific surface roughness and dynamic friction coefficient of the substrate layer 2. In the case where the substrate layer 2 forms a multilayer substrate layer, the thickness of the substrate layer 2 may be 1.0 to 8.0 times, or 2.0 to 6.0 times larger than the average particle diameter D of the filler. Further, when the substrate layer 2 forms a multilayer substrate layer, the thickness of the substrate layer 2 may be, specifically, 5 to 100 µm, or 10 to 50 µm. The support layer may be, for example, a film composed of the same or similar organic polymer compound as the substrate layer 2. The support layer may optionally not contain a filler. When the support layer contains no filler, the transparency of the gas barrier film tends to improve. The support layer may have a thickness of, for example, ⅓ to 9/10 of the thickness of the entire substrate layer.

Anchor Coat Layer

In the present embodiment, the anchor coat layer 3a is provided to enhance the adhesion between the substrate layer 2 and the gas barrier layer 4, and to suppress cracking or damage of the gas barrier layer 4 due to the surface roughness of the substrate layer 2 or the like. In this embodiment (in the case where only the anchor coat layer 3a is disposed between the substrate layer 2 and the gas barrier layer 4, as shown in FIG. 1), the thickness $T_A$ of the anchor coat layer 3a is 0.02 to 0.40 µm, preferably 0.02 to 0.30 µm, more preferably 0.03 to 0.25 µm, even more preferably 0.04 to 0.20 µm, and particularly preferably 0.04 to 0.10 µm.

When the thickness $T_A$ of the anchor coat layer 3a is no smaller than 0.02 µm, breakage of the gas barrier layer 4 can be suppressed, and thus the water vapor barrier properties of the gas barrier film 1 can be improved. When the thickness $T_A$ of the anchor coat layer 3a is no larger than 0.40 µm, occurrence of cracks in the anchor coat layer 3a can be reduced, and thus the water vapor barrier properties of the gas barrier film 1 can be improved.

In the present embodiment, the ratio of the average particle diameter D of the filler F to the thickness $T_A$ of the anchor coat layer 3a ($D/T_A$) is preferably no greater than 30.0, more preferably no greater than 20.0, and even more preferably no greater than 10.0. Further, the ratio ($D/T_A$) is preferably no smaller than 2.0, more preferably greater than 5.0, and even more preferably no smaller than 5.5. When the ratio ($D/T_A$) is no smaller than 2.0, the transportability tends to improve. When the ratio ($D/T_A$) is no greater than 30.0, cracking of the gas barrier layer due to the filler in the substrate layer 2 tends to be further suppressed. Further, when the ratio ($D/T_A$) is greater than 5.0, the amount of the added filler F can be suppressed, and thus low haze (high transparency) is easily obtained. In the present embodiment, since only the anchor coat layer 3a is disposed between the substrate layer 2 and the gas barrier layer 4, the thickness $T_A$ of the anchor coat layer 3a (that is, the thickness of the organic compound layer 3) is the total thickness T of the layer disposed between the substrate layer 2 and the gas barrier layer 4.

In the present embodiment, the anchor coat layer 3a is formed by applying the anchor coat layer composition onto the substrate layer 2 and heating it. Preferably the anchor coat layer composition contains a polyol and an isocyanate compound. The polyol is a compound having two or more hydroxyl groups, and the isocyanate compound is a compound having an isocyanate group.

The polyol preferably has a (meth)acryl group, more preferably a homopolymer of a (meth)acrylic acid derivative monomer or a copolymer of a (meth)acrylic acid derivative monomer, and even more preferably a copolymer of a (meth)acrylic acid derivative monomer and a styrene monomer. Hereinafter, polyols having a (meth)acryl group may be referred to as acrylic polyols. Examples of the (meth)acrylic acid derivative monomer include ethyl methacrylate, hydroxyethyl methacrylate, hydroxypropyl methacrylate, hydroxybutyl methacrylate, and the like. These may be used singly or in a combination of two or more.

The isocyanate compound reacts with polyol to form a urethane bond and be cured. That is, the isocyanate compound can act as a crosslinking agent or curing agent for polyol. The cured product having a urethane bond can improve the adhesion between the substrate layer 2 and the inorganic compound layer 4v, and since it further has good flexibility, it can reduce occurrence of cracks in the anchor coat layer 3a.

Examples of the isocyanate compound include aromatic isocyanate compounds such as tolylene diisocyanate (TDI), xylene diisocyanate (XDI), and diphenylmethane diisocyanate (MDI); aliphatic isocyanate compounds such as hexamethylene diisocyanate (HMDI) and isophorone diisocyanate (IPDI). The isocyanate compound may be a derivative or a polymer of an aromatic isocyanate compound and an aliphatic isocyanate compound. These may be used singly or in a combination of two or more.

The compounding ratio of the polyol and the isocyanate compound in the anchor coat layer composition is determined based on the ratio of the number of isocyanate groups (NCO groups) possessed by the isocyanate compound to the number of hydroxyl groups (OH groups) possessed by the polyol (NCO group/OH group). The ratio (NCO group/OH group) is preferably 0.1 to 10, more preferably 0.2 to 5.0, and even more preferably 0.5 to 2.0. When the amount of the isocyanate group is too small, the curing may be insufficient, and when the amount of the isocyanate compound is too large, blocking or the like may occur and cause a processing issue.

Preferably the anchor coat layer composition forming the anchor coat layer 3a further contains a silane coupling agent or a hydrolyzate thereof. Examples of the silane coupling agent include vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane and the like.

The silane coupling agent preferably has a functional group that can react with the hydroxyl group of the polyol or the isocyanate group of the isocyanate compound. When the anchor coat layer 3a contains the silane coupling agent having such a functional group, the functional group bonds with the hydroxyl group in the polyol or the isocyanate group in the isocyanate compound, and thus a stronger anchor coat layer 3a tends to be formed. In addition, since the silanol group formed by the hydrolysis of the alkoxy group of the silane coupling agent interacts with the metal or hydroxyl group in the inorganic oxide, better adhesion with the inorganic compound layer 4v can be obtained. Examples of the silane coupling agent include an isocyanate group-containing silane coupling agent, a mercapto group-containing silane coupling agent, an amino group-containing silane coupling agent, and an epoxy group-containing silane coupling agent. Examples of the isocyanate group-containing silane coupling agent include γ-isocyanatopropyltriethoxysilane and γ-isocyanatopropyltrimethoxysilane. Examples of the mercapto group-containing silane coupling agent include γ-mercaptopropyltriethoxysilane. Examples of the amino group-containing silane coupling agent include γ-aminopropyltriethoxysilane, γ-aminopropyltrimethoxysilane, N-β-(aminoethyl)-γ-aminopropyltriethoxysilane, and γ-phenylaminopropyltrimethoxysilane. Examples of the epoxy group-containing silane coupling agent include γ-glycidoxypropyltrimethoxysilane and β-(3,4-epoxycyclohexyl)ethyltrimethoxysilane. These may be used singly or in a combination of two or more.

The content of the silane coupling agent in the anchor coat layer composition is preferably 0.1 to 100 parts by mass, and preferably 1.0 to 50 parts by mass with respect to 100 parts by mass of polyol.

The anchor coat layer composition may contain a solvent. Examples of the solvent include esters such as ethyl acetate and butyl acetate; alcohols such as methanol, ethanol, and isopropyl alcohol; ketones such as methyl ethyl ketone; and aromatic hydrocarbons such as toluene and xylene.

Inorganic Compound Layer

In the present embodiment, the inorganic compound layer 4v is formed on the anchor coat layer 3a by, for example, vapor deposition. The inorganic compound layer 4v preferably contains an inorganic oxide. Examples of the inorganic oxide include oxides of aluminum, copper, silver, yttrium, tantalum, silicon, magnesium, and the like. Since inorganic oxides are inexpensive and have good barrier properties, a preferably example is silicon oxide ($SiO_x$, x is 1.4 to 2.0). When x is equal to or greater than 1.4, good barrier properties tend to be obtained.

The inorganic compound layer 4v preferably has a thickness of 0.005 to 0.50 μm, and more preferably 0.01 to 0.30 μm. When the thickness of the inorganic compound layer 4v is equal to or greater than 0.005 μm, a uniform film tends to be obtained, and thus good barrier properties tend to be obtained. On the other hand, since the thickness of the inorganic compound layer 4v is no greater than 0.50 μm, the inorganic compound layer 4v can maintain its flexibility, and this tends to prevent cracking or the like due to bending or an external force such as pulling after film formation.

Overcoat Layer

In the present embodiment, the overcoat layer 4c is formed on the inorganic compound layer 4v so as to prevent various kinds of secondary damage in the subsequent steps and to provide better barrier properties. In the present embodiment, preferably the overcoat layer 4c is formed from an overcoat layer composition containing at least one selected from the group consisting of a metal alkoxide represented by the following formula (1) and a hydrolyzate thereof.

$$M(OR^1)_m(R^2)_{n-m} \qquad (1)$$

In the above formula (1), $R^1$ and $R^2$ are each independently a monovalent organic group having 1 to 8 carbon atoms, and preferably an alkyl group such as a methyl group or an ethyl group. M represents an n-valent metal atom such as Si, Ti, Al, Zr or the like. n represents the valence of the metal atom represented by M, as described above. m represents an integer from 1 to n. Examples of the metal alkoxide include tetraethoxysilane [$Si(OC_2H_5)_4$] and triisopropoxy aluminum [$Al(O-iso-C_3H_7)_3$]. The metal alkoxide is preferably tetraethoxysilane or triisopropoxyaluminum since they are relatively stable in an aqueous solvent after hydrolysis. Examples of the hydrolyzate of the metal alkoxide include silicic acid ($Si(OH)_4$) which is a hydrolyzate of tetraethoxysilane and aluminum hydroxide ($Al(OH)_3$) which is a hydrolyzate of triisopropoxyaluminum. These may be used singly or in a combination of two or more. The content of the metal alkoxide and its hydrolyzate in the overcoat layer composition is preferably, for example, in the case where M is Si, 1 to 50% by mass as solid content converted to $Si(OH)_4$ with respect to the total solid content. When this content is no smaller than 1% by mass, the water resistance effect tends to be obtained, and when the content is no larger than 50% by mass, flexibility of the film can be ensured and cracks are less likely to occur, and therefore the gas barrier properties tend to be obtained. In order to obtain even better water resistance and gas barrier properties, the above content is more preferably from 5 to 30% by mass with respect to the total solid content.

The overcoat layer composition may further contain a hydroxyl group-containing polymer compound. Examples of the hydroxyl group-containing polymer compound include water-soluble polymers such as polyvinyl alcohol, polyvinyl pyrrolidone and starch. From the viewpoint of the barrier properties, the hydroxyl group-containing polymer compound is preferably polyvinyl alcohol. These may be used singly or in a combination of two or more.

The overcoat layer 4c is formed by applying an overcoat layer composition on the inorganic compound layer 4v and heating the applied film. The thickness of the overcoat layer 4c is preferably 0.05 to 2.0 μm, and more preferably 0.10 to 1.0 μm. When the thickness of the overcoat layer 4c is no smaller than 0.05 μm, more sufficient gas barrier properties tend to be obtained. When it is no larger than 2.0 µm, sufficient flexibility tends to be maintained.

Figure 2:
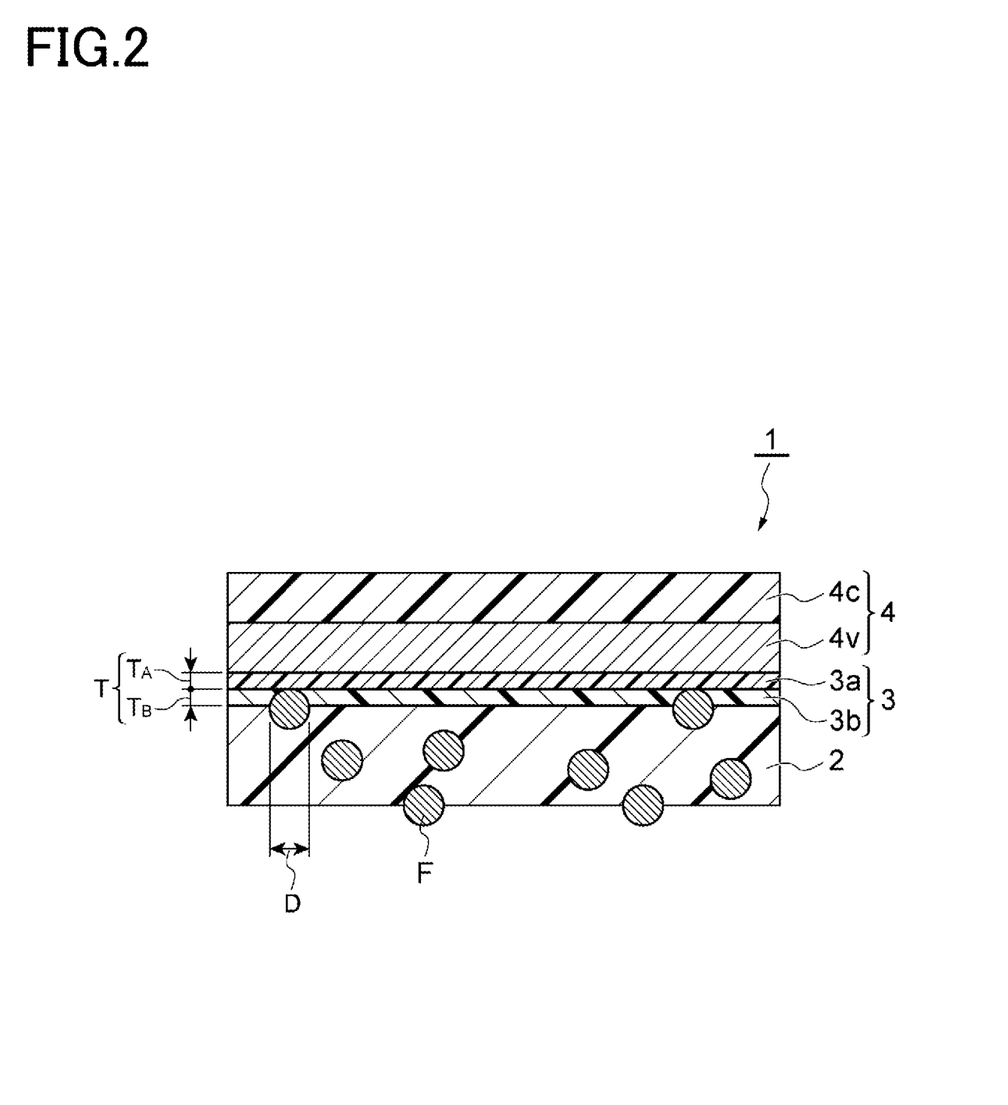
FIG. 2 is a schematic cross-sectional view showing a gas barrier film according to the second embodiment of the present invention.

FIG. 2 is a schematic cross-sectional view showing a gas barrier film according to the second embodiment of the present invention. The gas barrier film 1 according to this embodiment includes a substrate layer 2, an easily-adhesive layer 3b disposed on the substrate layer 2, an anchor coat layer 3a provided on the easily-adhesive layer 3b, and a gas barrier layer 4 provided on the anchor coat layer 3a. The gas barrier film according to this embodiment is different from the gas barrier film according to the first embodiment in that an easily-adhesive layer 3b is provided between the substrate layer 2 and the anchor coat layer 3a.

In the present embodiment, the easily-adhesive layer 3b and the anchor coat layer 3a constitute the organic compound layer 3, and the easily-adhesive layer 3b and the anchor coat layer 3a are disposed between the substrate layer 2 and the gas barrier layer 4. Accordingly, in the present embodiment, the sum of the thickness $T_A$ of the anchor coat layer 3a and the thickness $T_B$ of the easily-adhesive layer 3b (i.e., the thickness of the organic compound layer 3) is the total thickness T of the layers disposed between the substrate layer 2 and the gas barrier layer 4. In the present embodiment, the thickness of the organic compound layer 3 is 0.02 to 0.40 µm, preferably 0.02 to 0.30 µm, more preferably 0.03 to 0.25 µm, even more preferably 0.04 to 0.20 µm, and particularly preferably 0.04 to 0.10 µm. When the thickness of the organic compound layer 3 is no smaller than 0.02 µm, breakage of the gas barrier layer 4 can be suppressed, and thus the water vapor barrier properties of the gas barrier film 1 can be improved. When the thickness of the organic compound layer 3 is no larger than 0.40 µm, occurrence of cracks in the organic compound layer 3 can be reduced, and thus the water vapor barrier properties of the gas barrier film 1 can be improved.

The arithmetic average roughness Ra of the surface of the easily-adhesive layer 3b provided on the substrate layer 2 is preferably 0.10 to 3.00 µm, more preferably 0.20 to 1.0 µm, and even more preferably 0.30 to 1.0 µm. Further, the maximum height Ry of the surface of the easily-adhesive layer 3b provided on the substrate layer 2 is preferably 0.20 to 3.00 µm, more preferably 0.50 to 2.0 µm, and even more preferably 1.00 to 1.50 µm. When the surface roughness of the easily-adhesive layer 3b is within the above ranges, it becomes easier to control the dynamic friction coefficient of the surface of the easily-adhesive layer 3b.

The surface of the easily-adhesive layer 3b having the above surface roughness tends to have, for example, a dynamic friction coefficient of no greater than 0.40. In the production of the gas barrier film 1 provided with the easily-adhesive layer 3b, a roll of the substrate provided with the easily-adhesive layer is unwound and transported. Since the dynamic friction coefficient of the surface of the easily-adhesive layer 3b provided on the substrate layer 2 is 0.40 or smaller, the transportability of the substrate during production of the gas barrier film tends to improve. Further, the dynamic friction coefficient of the surface of the easily-adhesive layer 3b provided on the substrate layer 2 may be 0.01 or larger.

In the present embodiment, the easily-adhesive layer 3b is provided to enhance the adhesion between the substrate layer 2 and the anchor coat layer 3a, and to further suppress cracking or damaging of the gas barrier layer 4 due to the surface roughness of the substrate layer 2 or the like. Examples of the material of the easily-adhesive layer 3b include acrylic resin, urethane resin, polyester resin, olefin resin, fluorine resin, vinyl resin, chlorine resin, styrene resin, various graft resins, epoxy resin, and silicone resin. A mixture of these resins can also be used. From the viewpoint of adhesion, it is preferable to use a polyester resin or an acrylic resin. In the present embodiment, the thickness of the easily-adhesive layer 3b is preferably set together with the thickness of the anchor coat layer 3a so that the total thickness T falls within a predetermined range. The thickness of the easily-adhesive layer 3b may be, for example, 0.01 to 0.20 µm, 0.02 to 0.10 µm, or 0.02 to 0.05 µm. In this case, the thickness of the anchor coat layer 3a may be, for example, 0.01 to 0.20 µm, 0.02 to 0.10 µm, or 0.02 to 0.05 µm.

In the present embodiment, the ratio of the average particle diameter D of the filler F to the thickness T of the organic compound layer 3 (D/T) is preferably no greater than 30.0, more preferably no greater than 20.0, and even more preferably no greater than 10.0. Further, the ratio (D/T) is preferably no smaller than 2.0, more preferably greater than 5.0, and even more preferably no smaller than 5.5. When the ratio (D/T) is no smaller than 2.0, the transportability tends to improve. When the ratio (D/T) is no greater than 30.0, cracking of the gas barrier layer due to the filler in the substrate layer 2 tends to be further suppressed. Further, when the ratio (D/T) is greater than 5.0, the amount of the added filler F can be suppressed, and thus low haze (high transparency) can be obtained.

Figure 3:
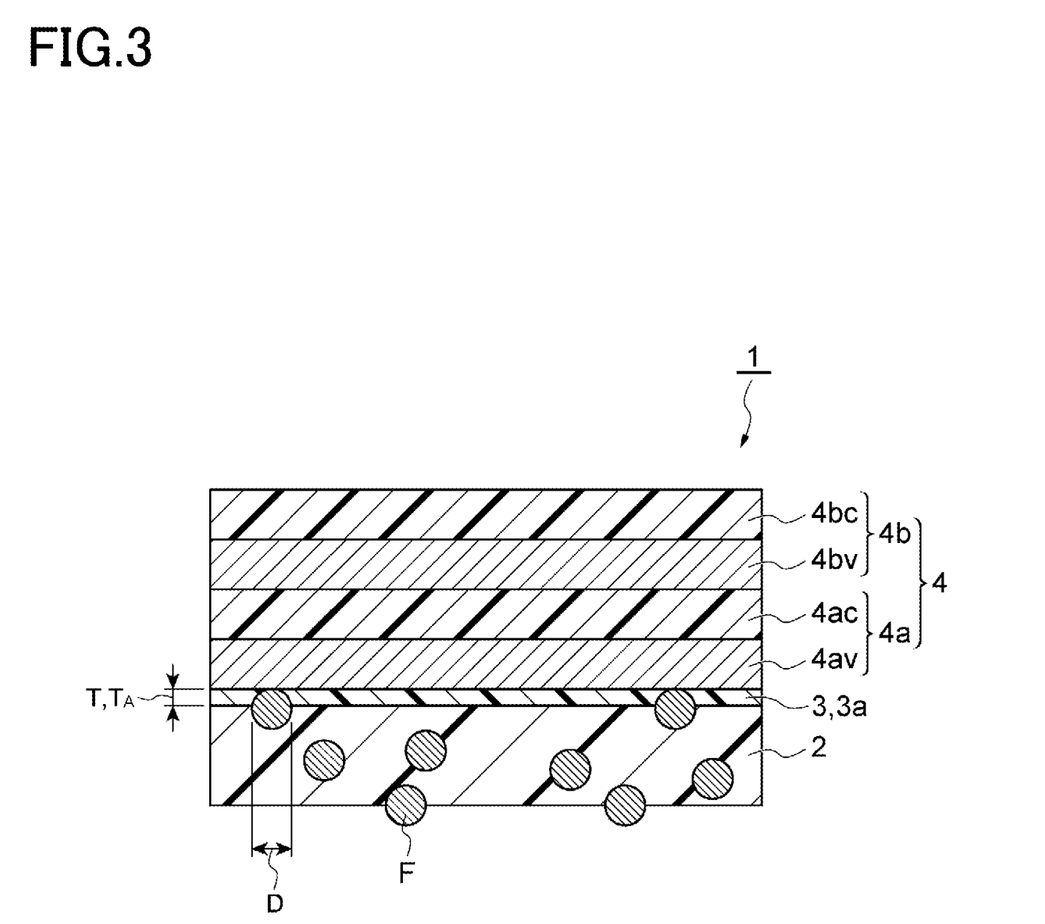
FIG. 3 is a schematic cross-sectional view showing a gas barrier film according to the third embodiment of the present invention.

The gas barrier film may have a plurality of gas barrier layers laminated. FIG. 3 is a schematic cross-sectional view showing a gas barrier film according to the third embodiment of the present invention. The gas barrier film 1 according to this embodiment is different from the gas barrier film according to the first embodiment in that another gas barrier layer 4b is provided on the gas barrier layer 4a. Since the gas barrier film 1 is provided with a plurality of gas barrier layers, the water vapor barrier properties of the gas barrier film 1 can be further improved. For example, the gas barrier layer 4a may be composed of a first inorganic compound layer 4av provided on the anchor coat layer 3a and a first overcoat layer 4ac provided on the first inorganic compound layer 4av. The gas barrier layer 4b may be composed of, for example, a second inorganic compound layer 4bv provided on the gas barrier layer 4a and a second overcoat layer 4bc provided on the second inorganic compound layer 4bv. In the gas barrier film 1 according to the present embodiment, the same or similar configuration as that of the gas barrier layer 4 of the first embodiment can be adopted for each of the gas barrier layers 4a and 4b, and the configurations of the gas barrier layers 4a and 4b may be the same or different from each other.

Figure 4:
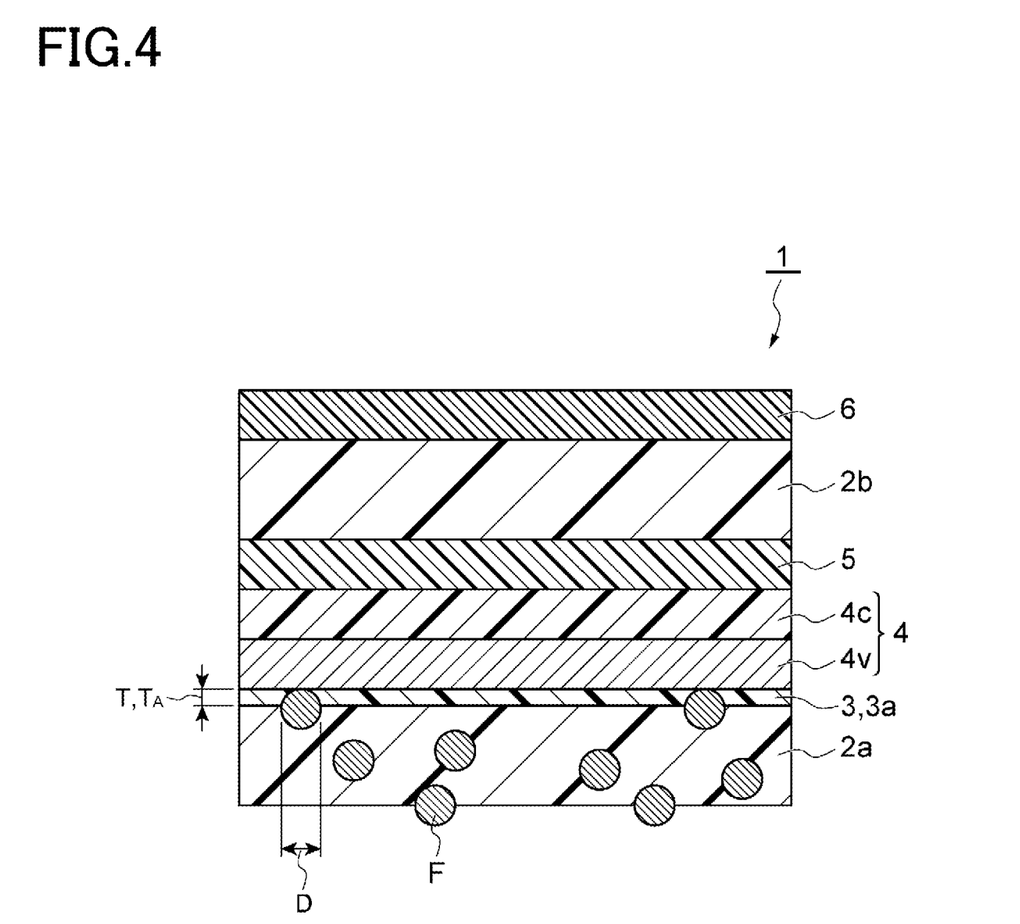
FIG. 4 is a schematic cross-sectional view showing a gas barrier film according to the fourth embodiment of the present invention.

FIG. 4 is a schematic cross-sectional view showing a gas barrier film according to the fourth embodiment of the present invention. The gas barrier film 1 according to this embodiment is different from the gas barrier layer 1 according to the first embodiment in that another substrate layer 2b is laminated on the gas barrier layer 4 via an adhesive layer 5 and in that another a matt layer 6 is formed on the side of the substrate layer 2b opposite to the gas barrier layer 4. In the present embodiment, the substrate layer including the filler F described with regard to the first embodiment is a first substrate layer 2a, and the other substrate layer bonded onto the gas barrier layer 4 is a second substrate layer 2b.

In the present embodiment, a pressure sensitive adhesive or an adhesive is applied over the gas barrier layer 4. Then, a substrate is laminated on the coated surface with aging if necessary, so that the second substrate layer 2b is laminated on the gas barrier layer 4 via the adhesive layer 5.

The adhesive layer 5 is formed of an adhesive or a pressure sensitive adhesive. Examples of the adhesive include acrylic adhesives and epoxy adhesives. Examples of the pressure sensitive adhesive include acrylic pressure sensitive adhesives, polyvinyl ether pressure sensitive adhesives, urethane pressure sensitive adhesives, and silicone pressure sensitive adhesives. The thickness of the adhesive layer 5 is preferably 1 to 20 µm, and more preferably 10 µm or smaller in order to reduce the total thickness of the gas barrier film 1. The second substrate layer 2b may have the same or similar configuration as the first substrate layer 2a, and the configurations of the first substrate 2a and the second substrate layer 2b may be the same or different from each other.

The matt layer 6 is provided to exhibit one or more optical functions and/or antistatic functions. Examples of the optical functions include a function of preventing interference fringes (moire), an antireflection function, and a diffusing function. In the present embodiment, a case where the matt layer 6 has at least the function of preventing interference fringes will be described.

The matt layer 6 includes, for example, a binder resin and fine particles. The fine particles are embedded in the binder resin so that the fine particles are partially exposed at the surface of the matt layer 6. As a result, the matt layer 6 has fine irregularities on its surface. By providing the gas barrier film 1 with the matt layer 6, occurrence of interference fringes such as Newton's rings can be more sufficiently suppressed.

The matt layer 6 is formed by applying a matt layer composition containing a binder resin, fine particles, etc. over the second substrate layer 2b and drying it as necessary. The binder resin may be a resin having good optical transparency. Examples of the binder resin include thermoplastic resin such as polyester resin, acrylic resin, acrylic urethane resin, polyester acrylate resin, polyurethane acrylate resin, urethane resin, epoxy resin, polycarbonate resin, polyamide resin, polyimide resin, melamine resin, and phenol resin; thermosetting resins; and radiation curable resins. These may be used singly or in a combination of two or more.

Examples of the fine particle include inorganic fine particles such as silica, clay, talc, calcium carbonate, calcium sulfate, barium sulfate, titanium oxide, and alumina; and organic fine particles such as styrene resin, urethane resin, silicone resin, and acrylic resin. These may be used singly or in a combination of two or more.

The average particle diameter of the fine particles is preferably 0.1 to 30 µm, and more preferably 0.5 to 10 µm. When the average particle diameter of the fine particles is no smaller than 0.1 µm, a good interference fringe prevention function tends to be obtained, and when it is no larger than 30 µm, the transparency tends to further improve.

The content of the fine particles in the matt layer 6 is preferably 0.5 to 30% by mass based on the total amount of the matt layer 6, and more preferably 3 to 10% by mass. When the content of the fine particles in the matt layer 6 is 0.5% by mass or greater, the light diffusing function and the effect of preventing occurrence of interference fringes tend to further improve, and when the content is 30% by mass or smaller, the reduction of luminance tends to decrease.

An easily-adhesive layer may be formed on the surface of the second substrate layer 2b. When an easily-adhesive layer is formed on the surface of the second substrate layer 2b, the matt layer 6 may be formed on the second substrate layer 2b via the easily-adhesive layer (not shown). The thickness of the easily-adhesive layer is preferably 0.005 to 0.1 µm, and more preferably 0.01 to 0.05 µm.

Since the gas barrier film described above has no transport problems during manufacturing and has good appearance and water vapor barrier properties, it is useful for the production of a packaging material for food, medicine, and the like, a color conversion member for a backlight of a liquid crystal display, a sealing member of an organic electroluminescence (organic EL) display, a color conversion member of an organic EL lighting, and a protective sheet of a solar cell, and it is particularly suitable for use as a color conversion member for a backlight of a liquid crystal display.

Color Conversion Member

Figure 5:
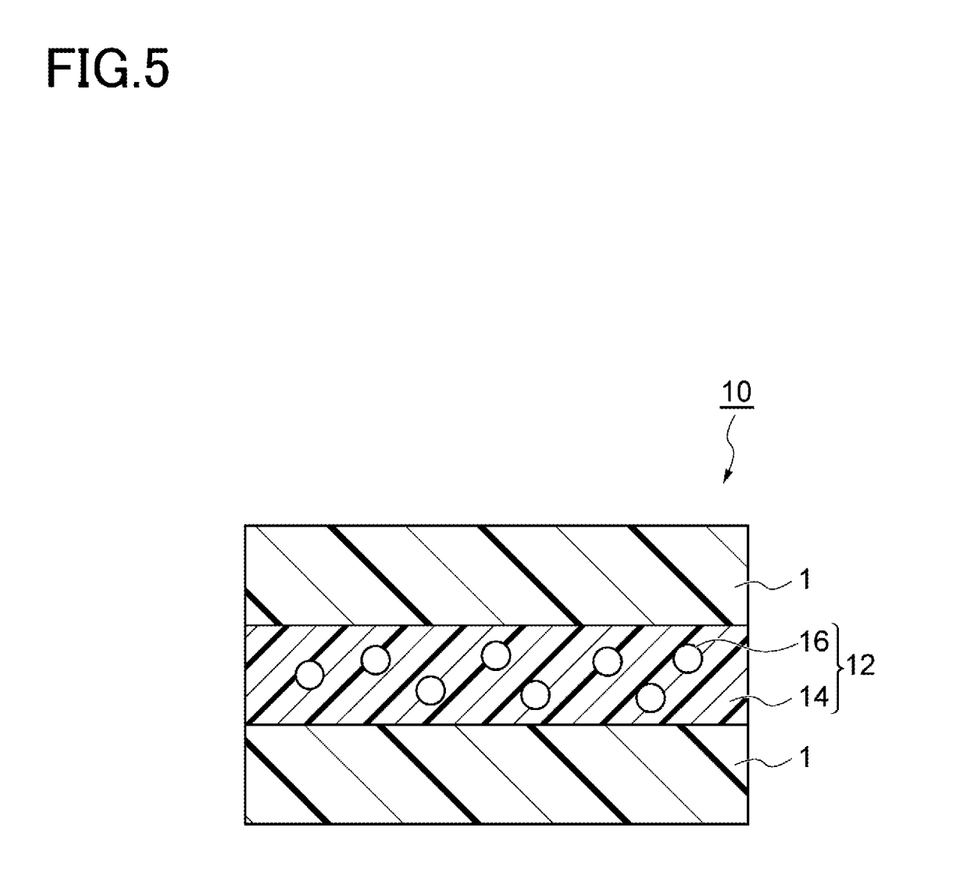
FIG. 5 is a schematic cross-sectional view of a color conversion member according to an embodiment of the present invention.

FIG. 5 is a schematic cross-sectional view of a color conversion member according to an embodiment of the present invention. The color conversion member 10 of the present embodiment includes a color conversion layer 12 and a pair of gas barrier films formed on the two faces of the color conversion layer 12. At least one of the gas barrier films is the gas barrier film 1 of the present invention, and the gas barrier film 1 is formed so that the substrate layer 2 and the color conversion layer 12 face each other.

The color conversion layer 12 includes a resin 14 and a phosphor 16. The thickness of the color conversion layer 12 is several tens to several hundreds of µm. The resin 14 may be, for example, a photocurable resin or a thermosetting resin. The phosphor preferably includes two kinds of phosphors in the form of quantum dots. The two kinds of phosphors are chosen to have the same excitation wavelength. The excitation wavelength is selected based on the wavelength of the light emitted by the light source. The fluorescent colors of the two kinds of phosphors are different from each other. The fluorescent colors are red and green.

Next, the particle structure of the phosphor 16 will be described. A suitable example of the phosphor 16 is a core-shell quantum dot having particularly good luminous efficiency. The core-shell quantum dots have a semiconductor crystal core as a light emitting part covered with a shell as a protective film. For example, cadmium selenide (CdSe) can be used for the core and zinc sulfide (ZnS) can be used for the shell. Since the surface defects of the CdSe particles are covered with ZnS having a large band gap, the quantum yield can be improved. Further, the phosphor 16 may have a structure in which the core is doubly covered with a first shell and a second shell. In this case, it is possible to use CdSe for the core, zinc selenide (ZnSe) for the first shell and ZnS for the second shell.

The color conversion layer 12 may have a single layer structure in which all phosphors 16 for converting blue light from the light source into red light or green light etc. are dispersed in a single layer, or it may have a multilayer structure in which the phosphors 16 are separately dispersed in multiple layers that are laminated.

After dispersing the phosphor 16 in the resin 14 and applying the prepared phosphor dispersion over the surface of the gas barrier film 1 on the side of the substrate layer 2, another gas barrier film is laminated on the coated surface. After curing the color conversion layer 12, the color conversion member 10 can be obtained.

EXAMPLES

In the following, the present invention will be specifically described with reference to examples, but the present invention is not limited thereto.

Preparation of Materials

Anchor Coat Layer Composition

Acrylic polyol and tolylene diisocyanate were mixed so that the number of NCO groups is equal to the number of OH groups of the acrylic polyol, and then diluted with ethyl acetate so that the total solid content is 5% by mass. β-(3,4-epoxycyclohexyl)ethyltrimethoxysilane was further added to the diluted mixture so that its content is 5% by mass based on the total solid content, and the mixed product was used to produce the anchor coat layer composition.

Overcoat Layer Composition 10.4 parts by mass of tetraethoxysilane was mixed with 89.6 parts by mass of hydrochloric acid (concentration: 0.1 N) and stirred for 30 minutes to obtain a hydrolyzed solution of tetraethoxysilane. On the other hand, polyvinyl alcohol was dissolved in a mixed solvent of water/isopropyl alcohol (water/isopropyl alcohol (mass ratio)=90:10) to obtain a polyvinyl alcohol solution of 3% by mass. 60 parts by mass of the hydrolyzed solution of tetraethoxysilane and 40 parts by mass of the polyvinyl alcohol solution were mixed to obtain the overcoat layer composition.

Matt Layer Composition 100 parts by mass of acrylic polyol (manufactured by DIC, trade name: ACRYDIC A-814), 8.5 parts by mass of isocyanate curing agent (manufactured by DIC, trade name: BURNOCK DN-980), 10 parts by mass of fine particles (polyurethane, average particle diameter of 2 μm), and 70 parts by mass of a solvent (ethyl acetate) were mixed to obtain the matt layer composition.

Preparation of Gas Barrier Film

Example 1

A roll of polyethylene terephthalate film containing silica with an average particle size of 1.50 μm was prepared (the first substrate layer, thickness: 25 μm, arithmetic average roughness Ra: 0.80 μm, maximum height Ry: 1.20 μm, dynamic friction coefficient: 0.39) (hereinafter referred to as "substrate A"). The substrate A was set on an unwinding device, a conveying device, and a winding device.

The anchor coat layer composition was applied and dried on one side of the substrate A being conveyed to form an anchor coat layer having a thickness of 0.10 μm on the first substrate layer (substrate A). Next, silicon oxide ($SiO_x$, x=1.8) was deposited on the anchor coat layer to form a first inorganic compound layer having a thickness of 0.03 μm on the anchor coat layer. Further, the overcoat layer composition was applied over the first inorganic compound layer and the coated film was heated to form a first overcoat layer having a thickness of 0.3 μm. In the same manner as the above process, a silicon oxide ($SiO_x$, x=1.8) was further deposited on the first overcoat layer to form a second inorganic compound layer having a thickness of 0.03 μm, and a second overcoat layer having a thickness of 0.3 μm was formed on the second inorganic compound layer, and thus a laminate was obtained.

A polyethylene terephthalate film (thickness: 16 μm) (hereinafter referred to as "substrate A") with an easily-adhesive layer (thickness: 0.05 μm) formed on one side of it was prepared. The matt layer composition was applied onto the face of the substrate A on which the easily-adhesive layer is formed and then dried to form a matt layer having a thickness of 3 μm on the easily-adhesive layer. The face of the polyethylene terephthalate film with the matt layer that is opposite to the face on which the matt layer was formed was bonded to the face of the laminate on which the gas barrier layer was formed via an acrylic pressure-sensitive adhesive.

Thus, the gas barrier film of Example 1 was prepared in which the first substrate layer (substrate A), the anchor coat layer, the first inorganic compound layer, the first overcoat layer, the second inorganic compound layer, the second overcoat layer, the adhesive layer, the second substrate layer (substrate a), the easily-adhesive layer and the matt layer are laminated in this order. The properties of the first substrate layer, the thickness of the anchor coat layer, and the ratio (D/T) of the average particle diameter D to the total thickness T are collectively shown in Table 1.

Next, after mixing CdSe/ZnS 530 (trade name, manufactured by SIGMA-ALDRICH) with an epoxy photosensitive resin, the mixture was applied to the first substrate layer side (the side opposite to the matt layer) of the gas barrier film. A gas barrier film having the same structure as that of the above-described gas barrier film except that the matt layer is not provided thereon was laminated in such a manner that the first substrate layer side faces the coated surface, and a color conversion member of Example 1 was prepared by UV curing lamination.

Example 2

A gas barrier film and a color conversion member of Example 2 were produced in the same manner as in Example 1 except that the thickness of the anchor coat layer is 0.20 μm. The properties of the first substrate layer, the thickness of the anchor coat layer, and the ratio (D/T) of the average particle diameter D to the total thickness T are collectively shown in Table 1.

Comparative Example 1

Instead of the substrate A, a roll of polyethylene terephthalate film containing silica with an average particle size of 0.01 μm was used (the first substrate layer, thickness: 25 μm, arithmetic average roughness Ra: 0.03 μm, maximum height Ry: 0.10 μm, dynamic friction coefficient: 0.45) to prepare the gas barrier film and the color conversion member of Comparative Example 1 in the same manner as in Example 1 except that the thickness of the anchor coat layer was changed to 0.05 μm. The properties of the first substrate layer, the thickness of the anchor coat layer, and the ratio (D/T) of the average particle diameter D to the total thickness T are collectively shown in Table 1.

Comparative Example 2

Instead of the substrate A, a roll of polyethylene terephthalate film containing silica with an average particle size of 3.20 μm was used (the first substrate layer, thickness: 25 μm, arithmetic average roughness Ra: 1.20 μm, maximum height Ry: 2.30 μm, dynamic friction coefficient: 0.31) to prepare the gas barrier film and the color conversion member of Comparative Example 2 in the same manner as in Example 1 except that the thickness of the anchor coat layer was changed to 0.20 μm. The properties of the first substrate layer, the thickness of the anchor coat layer, and the ratio (D/T) of the average particle diameter D to the total thickness T are collectively shown in Table 1.

TABLE 1

| | First substrate layer | | | | | Anchor | |
|---|---|---|---|---|---|---|---|
| | Filler average particle diameter (μm) | Thickness (μm) | Arithmetic average roughness Ra (μm) | Maximum height Ry (μm) | Dynamic friction coefficient | coat layer Thickness (μm) | Ratio D/T |
| Ex. 1 | 1.50 | 25 | 0.80 | 1.20 | 0.39 | 0.10 | 15.0 |
| Ex. 2 | 1.50 | 25 | 0.80 | 1.20 | 0.39 | 0.20 | 7.5 |
| Comp. Ex. 1 | 0.01 | 25 | 0.03 | 0.10 | 0.45 | 0.05 | 0.2 |
| Comp. Ex. 2 | 3.20 | 25 | 1.20 | 2.30 | 0.31 | 0.20 | 16.0 |

Example 3

A roll of polyethylene terephthalate film that has an easily-adhesive layer (thickness: 0.05 μm) formed on one side of it and contains silica with an average particle size of 1.50 μm was prepared (the first substrate layer, thickness: 25 μm, arithmetic average roughness Ra: 0.80 μm, maximum height Ry: 1.20 μm, dynamic friction coefficient: 0.39) (hereinafter referred to as "substrate B"). The substrate B was set on an unwinding device, a conveying device, and a winding device. The arithmetic average roughness Ra of the surface of the substrate B on the side on which the easily-adhesive layer was formed was 0.75 μm, the maximum height Ry was 1.10 μm, and the dynamic friction coefficient was 0.31.

The anchor coat layer composition was applied and dried on the surface of the substrate B being conveyed on the side on which the easily-adhesive layer is formed to form an anchor coat layer having a thickness of 0.05 μm on the substrate B. Next, silicon oxide ($SiO_x$, x=1.8) was deposited on the anchor coat layer to form a first inorganic compound layer having a thickness of 0.03 μm on the anchor coat layer. Further, the overcoat layer composition was applied over the first inorganic compound layer and the coated film was heated to form a first overcoat layer having a thickness of 0.3 μm. In the same manner as the above process, a silicon oxide ($SiO_x$, x=1.8) was further deposited on the first overcoat layer to form a second inorganic compound layer having a thickness of 0.03 μm, and a second overcoat layer having a thickness of 0.3 μm was formed on the second inorganic compound layer, and thus a laminate was obtained.

The substrate a used in Example 1 was prepared. The matt layer composition was applied onto the face of the substrate on which the easily-adhesive layer is formed and then dried to form a matt layer having a thickness of 3 μm on the easily-adhesive layer. The face of the polyethylene terephthalate film with the matt layer that is opposite to the face on which the matt layer was formed was bonded to the face of the laminate on which the gas barrier layer was formed via an acrylic pressure-sensitive adhesive.

Thus, the gas barrier film of Example 3 was prepared in which the first substrate layer, the easily-adhesive layer, the anchor coat layer, the first inorganic compound layer, the first overcoat layer, the second inorganic compound layer, the second overcoat layer, the adhesive layer, the second substrate layer (substrate a), the easily-adhesive layer and the matt layer are laminated in this order. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Next, after mixing CdSe/ZnS 530 (trade name, manufactured by SIGMA-ALDRICH) with an epoxy photosensitive resin, the mixture was applied to the first substrate layer side (the side opposite to the matt layer) of the gas barrier film. A gas barrier film having the same structure except that the matt layer is not provided thereon was laminated in such a manner that the first substrate layer side faces the coated surface, and a color conversion member of Example 3 was prepared by UV curing lamination.

Example 4

A gas barrier film and a color conversion member of Example 4 were produced in the same manner as in Example 3 except that the thickness of the anchor coat layer was changed to 0.20 μm. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Example 5

A gas barrier film and a color conversion member of Example 5 were prepared in the same manner as in Example 3 except that, in place of the substrate B, a roll of polyethylene terephthalate film that has an easily-adhesive layer (thickness: 0.20 μm) formed on one side of it and contains silica with an average particle size of 1.50 μm was used (thickness: 25 μm, arithmetic average roughness Ra: 0.60 μm, maximum height Ry: 1.00 μm, dynamic friction coefficient: 0.50) (hereinafter referred to as "substrate C"). The arithmetic average roughness Ra of the surface of the substrate C on the side on which the easily-adhesive layer was formed was 0.75 μm, the maximum height Ry was 1.05 μm, and the dynamic friction coefficient was 0.34. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Example 6

A gas barrier film and a color conversion member of Example 6 were prepared in the same manner as in Example 3 except that, in place of the substrate B, a roll of polyethylene terephthalate film that has an easily-adhesive layer (thickness: 0.20 μm) formed on one side of it and contains silica with an average particle size of 0.90 μm was used (thickness: 25 μm, arithmetic average roughness Ra: 0.80 μm, maximum height Ry: 1.20 μm, dynamic friction coefficient: 0.40) (hereinafter referred to as "substrate D"). The arithmetic average roughness Ra of the surface of the substrate D on the side on which the easily-adhesive layer was formed was 0.40 μm, the maximum height Ry was 0.80 μm, and the dynamic friction coefficient was 0.35. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Example 7

A gas barrier film and a color conversion member of Example 7 were prepared in the same manner as in Example 6 except that the thickness of the anchor coat layer was changed to 0.10 μm. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Example 8

A gas barrier film and a color conversion member of Example 8 were prepared in the same manner as in Example 6 except that the thickness of the anchor coat layer was changed to 0.20 μm. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Comparative Example 3

A gas barrier film and a color conversion member of Comparative Example 3 were prepared in the same manner as in Example 3 except that, in place of the substrate B, a roll of polyethylene terephthalate film that has an easily-adhesive layer (thickness: 0.05 μm) formed on one side of it and contains silica with an average particle size of 0.01 μm was used (thickness: 25 μm, arithmetic average roughness Ra: 0.05 μm, maximum height Ry: 0.15 μm, dynamic friction coefficient: 0.43) (hereinafter referred to as "substrate E"). The arithmetic average roughness Ra of the surface of the substrate E on the side on which the easily-adhesive layer was formed was 0.05 μm, the maximum height Ry was 0.15 μm, and the dynamic friction coefficient was 0.43. The properties of the first substrate layer, the properties of the easily-adhesive layer on the first substrate layer, the thickness of the anchor coat layer, and the ratio (D/T) of the average particle diameter D to the total thickness T are collectively shown in Table 2.

Comparative Example 4

A gas barrier film and a color conversion member of Comparative Example 4 were prepared in the same manner as in Example 3 except that, in place of the substrate B, a roll of polyethylene terephthalate film that has an easily-adhesive layer (thickness: 0.05 μm) formed on one side of it and contains silica with an average particle size of 3.50 μm was used (thickness: 25 μm, arithmetic average roughness Ra: 1.20 μm, maximum height Ry: 2.00 μm, dynamic friction coefficient: 0.30) (hereinafter referred to as "substrate F"). The arithmetic average roughness Ra of the surface of the substrate F on the side on which the easily-adhesive layer was formed was 1.20 μm, the maximum height Ry was 2.00 μm, and the dynamic friction coefficient was 0.30. The properties of the first substrate layer, the properties of the easily-adhesive layer on the first substrate layer, the thickness of the anchor coat layer, and the ratio (D/T) of the average particle diameter D to the total thickness T are collectively shown in Table 2.

TABLE 2

| | First substrate layer | | Easily-adhesive layer | | | | Anchor | |
| --- | --- | --- | --- | --- | --- | --- | --- | --- |
| | Filler average particle diameter (μm) | Thickness (μm) | Thickness (μm) | Arithmetic average roughness Ra (μm) | Maximum height Ry (μm) | Dynamic friction coefficient | coat layer Thickness (μm) | Ratio D/T |
| Ex. 3 | 1.50 | 25 | 0.05 | 0.75 | 1.10 | 0.31 | 0.05 | 15.0 |
| Ex. 4 | 1.50 | 25 | 0.05 | 0.75 | 1.10 | 0.31 | 0.20 | 6.0 |
| Ex. 5 | 1.50 | 25 | 0.20 | 0.75 | 1.05 | 0.34 | 0.05 | 6.0 |
| Ex. 6 | 0.90 | 25 | 0.20 | 0.40 | 0.80 | 0.35 | 0.05 | 3.6 |
| Ex. 7 | 0.90 | 25 | 0.20 | 0.40 | 0.80 | 0.35 | 0.10 | 3.0 |
| Ex. 8 | 0.90 | 25 | 0.20 | 0.40 | 0.80 | 0.35 | 0.20 | 2.3 |
| Comp. Ex. 3 | 0.01 | 25 | 0.05 | 0.05 | 0.15 | 0.43 | 0.05 | 0.1 |
| Comp. Ex. 4 | 3.50 | 25 | 0.05 | 1.20 | 2.00 | 0.30 | 0.05 | 35.0 |

Evaluation Method

Transportability of Substrate

Each substrate (with the easily-adhesive layer if the substrate is provided with one) used in the first substrate layer to prepare each gas barrier film of the Examples and Comparative Examples was set on an unwinding device, a conveying device, and a winding device, and conveyed at a conveying speed of 100 m/min. The substrate in the conveying device was visually observed, and the transportability was evaluated according to the following criteria. The evaluation results are shown in Tables 3 and 4.

A: In the conveying device, no meandering, distortion, or wrinkling of the substrate is observed.

B: In the conveying device, the substrate meanders and distortion or wrinkling is observed.

Appearance of Gas Barrier Film

The gas barrier films obtained from the Examples and Comparative Examples were visually observed to evaluate their appearance according to the following criteria. The evaluation results are shown in Tables 3 and 4.

A: No cracks are observed in the gas barrier film.
B: Cracks are observed in the gas barrier film.

Water Vapor Barrier Properties

Each of the laminates obtained from the Examples and Comparative Examples was cut into a size of 40 mm×40 mm. A calcium layer was formed on the face of the laminate on the side where the gas barrier layer was formed. The face on which the calcium layer was formed was sealed with a glass substrate to obtain a sealed unit as a sample. The sealed unit was stored for 1000 hours under an atmosphere of a temperature of 60° C. and a humidity of 90% RH. After the storing, the sealed unit was observed with a microscope, and the number of dot-like portions at which the calcium has corroded was counted. The evaluation results are shown in Tables 3 and 4.

Dark Spots

Each of the color conversion members obtained from the Examples and Comparative Examples was stored for 1000 hours under an atmosphere of a temperature of 85° C. and a humidity of 85% RH. After the storing, the color conversion member was irradiated with UV lamp light (wavelength 365 nm), and the transmitted light was visually observed from the matt layer side to count the number of dark spots. The evaluation results are shown in Tables 3 and 4.

TABLE 3

| | Evaluation results | | | |
|---|---|---|---|---|
| | Transportability | Appearance | Water vapor barrier properties (number) | Dark spot (number) |
| Ex. 1 | A | A | 1 | 1 |
| Ex. 2 | A | A | 3 | 2 |
| Comp. Ex. 1 | B | B | 35 | 41 |
| Comp. Ex. 2 | A | B | 6 | 18 |

TABLE 4

| | Evaluation results | | | |
|---|---|---|---|---|
| | Transportability | Appearance | Water vapor barrier properties (number) | Dark spot (number) |
| Ex. 3 | A | A | 1 | 1 |
| Ex. 4 | A | A | 4 | 3 |
| Ex. 5 | A | A | 5 | 5 |
| Ex. 6 | A | A | 0 | 1 |
| Ex. 7 | A | A | 2 | 3 |
| Ex. 8 | A | A | 3 | 3 |
| Comp. Ex. 3 | B | B | 33 | 37 |
| Comp. Ex. 4 | A | B | 7 | 19 |

Regarding Examples 1 to 8 in which the surface of the first substrate layer (or easily-adhesive layer) has a large surface roughness and a small dynamic friction coefficient, the transportability of the substrate during the preparation of the gas barrier film was good, and it was confirmed that there were no practical problems with the appearance and the water vapor barrier properties of the obtained gas barrier film. On the other hand, since Comparative Examples 1 and 3 have small surface roughness and large dynamic friction coefficients, the gas barrier film showed degradation due to meandering, distortion, and wrinkling during conveyance of the substrate. Since Comparative Examples 2 and 4 have very large surface roughness, the transportability was good, but the surface irregularities could hardly be covered with the organic compound layer, and the gas barrier film showed degradation due to cracks formed in the inorganic compound layer.

REFERENCE SIGNS LIST

1 . . . Gas barrier film; 2 . . . Substrate layer; 2a . . . First substrate layer; 3 . . . Organic compound layer; 3a . . . Anchor coat layer; 3b . . . Easily-adhesive layer; 4 . . . Gas barrier layer; 4v, 4av, 4bv . . . Inorganic compound layer; 4c, 4ac, 4bc . . . Overcoat layer; 5 . . . Adhesive layer; 2b . . . Second substrate layer; 6 . . . Matt layer; 10 . . . Color conversion member; 12 . . . Color conversion layer; 14 . . . Resin; 16 . . . Phosphor.

What is claimed is:

1. A gas barrier film comprising a substrate layer containing a filler, an anchor coat layer provided on the substrate layer, and a gas barrier layer provided on the anchor coat layer, wherein
the filler has an average particle diameter D of 0.02 to 3.00 μm,
the substrate layer has a thickness equal to or larger than the average particle diameter of the filler,
a total thickness T of one or more layers disposed between the substrate layer and the gas barrier layer is 0.02 to 0.40 μm,
a thickness of the substrate layer is 15 to 30 μm, and
the ratio (D/T) of the average particle diameter D of the filler to the total thickness T of the one or more layers disposed between the substrate layer and the gas barrier layer is from 2.3 to 15.

2. The gas barrier film of claim 1, wherein the total thickness T of the one or more layers disposed between the substrate layer and the gas barrier layer is 0.02 to 0.30 μm.

3. The gas barrier film of claim 2, wherein the ratio (D/T) of the average particle diameter D of the filler to the total thickness T of the one or more layers disposed between the substrate layer and the gas barrier layer is larger than 5.0 and equal to or smaller than 15.

4. The gas barrier film of claim 1, wherein the total thickness T of the one or more layers disposed between the substrate layer and the gas barrier layer is 0.04 to 0.25 μm.

5. The gas barrier film of claim 4, wherein the ratio (D/T) of the average particle diameter D of the filler to the total thickness T of the one or more layers disposed between the substrate layer and the gas barrier layer is larger than 5.0 and equal to or smaller than 15.0.

6. The gas barrier film of claim 1, further comprising an easily-adhesive layer provided on the substrate layer, wherein
the anchor coat layer is provided on the easily-adhesive layer, and
the easily-adhesive layer has a thickness of 0.01 to 0.20 μm.

7. The gas barrier film of claim 6, wherein the thickness of the easy-adhesive layer is 0.05 to 0.20 μm.

8. The gas barrier film of claim 7, wherein the average particle diameter of the filler is from 0.9 μm to 1.5 μm.

9. The gas barrier film of claim 6, wherein the average particle diameter of the filler is from 0.9 μm to 1.5 μm.

10. The gas barrier film of claim 6, wherein a roughness of the easily adhesive layer is from 0.40 to 0.75 μm.

11. The gas barrier film of claim 1, wherein the anchor coat layer is formed of a composition containing acrylic polyol and an isocyanate compound.

12. The gas barrier film of claim 1, wherein the gas barrier layer is composed of an inorganic compound layer provided on the anchor coat layer and an overcoat layer provided on the inorganic compound layer, and the overcoat layer is formed of a composition containing at least one selected from the group consisting of metal alkoxide represented by the following formula (1) and a hydrolyzate thereof:

$$M(OR^1)_m(R^2)_{n-m} \qquad (1)$$

wherein formula (1), each of $R^1$ and $R^2$ independently represents a monovalent organic group having 1 to 8 carbon atoms, M represents an n-valent metal atom, and m represents an integer from 1 to n.

13. A color conversion member comprising a color conversion layer and a pair of gas barrier films formed on the two faces of the color conversion layer, wherein at least one of the gas barrier films is the gas barrier film of claim 1.

14. The color conversion member of claim 13, wherein the color conversion layer comprises a phosphor composed of quantum dots.

* * * * *